(12) United States Patent
Bentvelsen et al.

(10) Patent No.: US 7,489,258 B2
(45) Date of Patent: Feb. 10, 2009

(54) DEVICE AND METHOD FOR EMBEDDING A SECONDARY SIGNAL IN A PRIMARY DATA BIT STREAM ON AN OPTICAL DISC

(75) Inventors: Peter Bentvelsen, Eindhoven (NL); Willem Marie Julia Marcel Coene, Eindhoven (NL); Bart Van Rompaey, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 106 days.

(21) Appl. No.: 11/577,365

(22) PCT Filed: Oct. 17, 2005

(86) PCT No.: PCT/IB2005/053396

§ 371 (c)(1), (2), (4) Date: Apr. 17, 2007

(87) PCT Pub. No.: WO2006/043228

PCT Pub. Date: Apr. 27, 2006

(65) Prior Publication Data

US 2008/0122667 A1 May 29, 2008

(30) Foreign Application Priority Data

Oct. 20, 2004 (EP) ................... 04105194

(51) Int. Cl.
*H03M 5/00* (2006.01)
(52) U.S. Cl. .......................... 341/58; 341/68
(58) Field of Classification Search ............ 341/58, 341/59, 50, 51, 68
See application file for complete search history.

(56) References Cited

U.S. PATENT DOCUMENTS

| | | | |
|---|---|---|---|
| 5,477,222 A | 12/1995 | Kahlman et al. | |
| 6,225,921 B1 | 5/2001 | Kahlman et al. | |
| 6,496,541 B1 | 12/2002 | Kahlman et al. | |
| 6,677,866 B2 | 1/2004 | Kahlman et al. | |
| 6,731,699 B2 * | 5/2004 | Pozidis et al. | 375/340 |
| 7,321,320 B2 * | 1/2008 | Shine | 341/58 |
| 7,336,207 B2 * | 2/2008 | Nakagawa | 341/59 |
| 7,423,561 B2 * | 9/2008 | Chen et al. | 341/59 |
| 2003/0142757 A1 | 7/2003 | Kahlman et al. | |

FOREIGN PATENT DOCUMENTS

WO 0215185 A1 2/2002

OTHER PUBLICATIONS

ISR/Written Opinion of the International Searching Authority PCT/IB2005/053396, Oct. 17, 2005.

* cited by examiner

*Primary Examiner*—Brian Young

(57) ABSTRACT

Devices and methods, record carrier and signal for embedding, extracting, carrying and representing secondary signal such as a copy protection signal embedded in a primary signal such as a blu ray disc signal modulated by a 17PP RMTR runlength limited modulation code. Each frame comprises a frame sync patterns followed by DC control blocks each including a DC control bit. Two modulation tables are used. Each bit of the secondary signal is represented by a relationship between the polarity of the frame sync signal and the values of the DC control bits in a fashion which complies with the constraints of the modulation code and the DC control algorithm.

17 Claims, 8 Drawing Sheets

Figure 1:
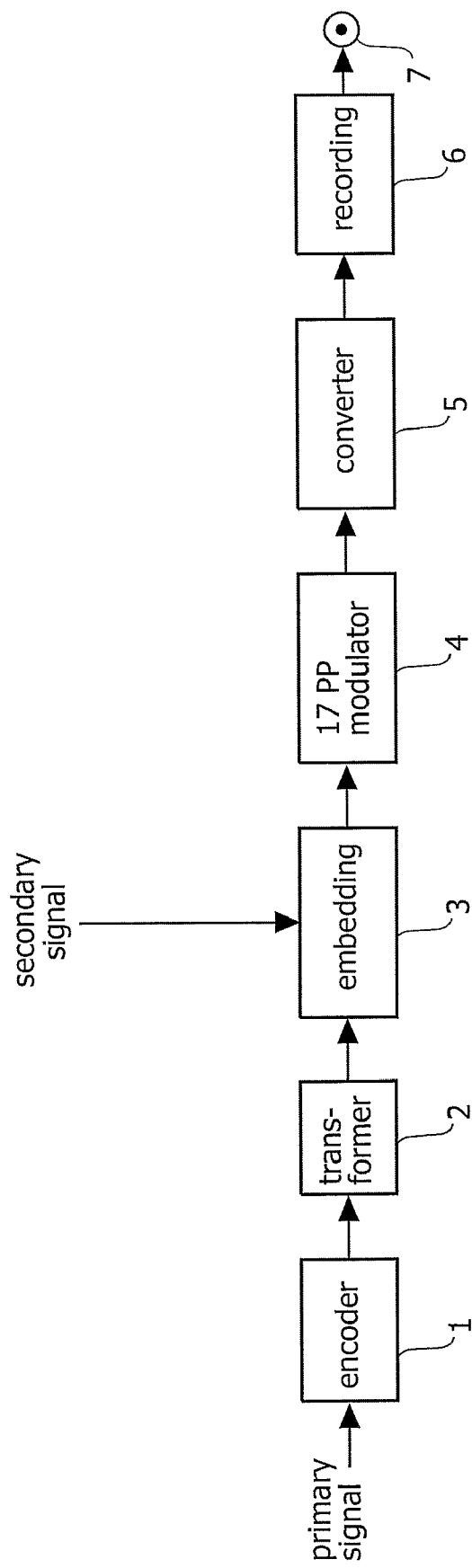

| data bits | modulation bits | |
|---|---|---|
| 00 00 00 00 | 010 100 100 100 | |
| 00 00 10 00 | 000 100 100 100 | |
| 00 00 00 | 010 100 000 | |
| 00 00 01 | 010 100 100 | |
| 00 00 10 | 000 100 000 | |
| 00 00 11 | 000 100 100 | |
| 00 01 | 000 100 | |
| 00 10 | 010 000 | |
| 00 11 | 010 100 | |
| 01 | 010 | |
| 10 | 001 | |
| 11 | 000 | if preceding modulation bits=xx1 |
| | 101 | if preceding modulation bits=xx0 |

| data bit pattern to be substituted | substituting modulation bits | condition for substitution |
|---|---|---|
| 11 01 11 | 001 000 000 | if next modulation bits =010 |

| terminating data bits | terminating modulation bits | |
|---|---|---|
| 00 00 | 01 100 | |
| 00 | 000 | |

| Sync number | 24-bit sync body | 6-bit sync ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 101 |
| FS5 | #01 010 000 000 010 000 000 010 | 001 001 |
| FS6 | #01 010 000 000 010 000 000 010 | 010 001 |

FIG.4

FIG.5

| DC-control bit | Origin | Possible last data bits before sync (incl DC-ctrl) | | | | modulation bits | | | | # bit sync | # sync | parity after #-bit of sync |
|---|---|---|---|---|---|---|---|---|---|---|---|---|
| 0 | terminating | | | | 00 | | | | 000 | 1 | 01.... | 1 |
| 1 | main table | | | | 01 | | | | 010 | 0 | 01.... | ① |
| 0 | main table | | | | 10 | | | | 001 | 0 | 01.... | 1 |
| 1 | main table, preceeding=xx1 | | | | 11 | | | | 000 | 0 | 01.... | 0 |
| 1 | main table, preceeding=xx0 | | | | 11 | | | | 101 | 1 | 01.... | 0 |
| 0 | terminating | | | 00 | 00 | | | 010 | 100 | 1 | 01.... | 1 |
| 1 | main table | | | 00 | 01 | | | 000 | 100 | ⓪ | 01.... | ① |
| 0 | main table | | | 00 | 10 | | | 010 | 000 | 0 | 01.... | 1 |
| 1 | main table | | | 00 | 11 | | | 010 | 100 | 0 | 01.... | 0 |
| 0 | main table | | 00 | 00 | 00 | | 010 | 100 | 100 | 0 | 01.... | 1 |
| 1 | main table | | 00 | 00 | 01 | | 010 | 100 | 000 | 0 | 01.... | 1 |
| 0 | main table | | 00 | 00 | 10 | | 000 | 100 | 100 | 0 | 01.... | 0 |
| 1 | main table | | 00 | 00 | 11 | | 000 | 100 | 000 | 0 | 01.... | 0 |
| 0 | main table | 00 | 00 | 00 | 00 | 000 | 100 | 000 | 010 | 0 | 01.... | 1 |
| 1 | main table | 00 | 00 | 00 | 01 | 010 | 100 | 010 | 001 | 0 | 01.... | 1 |
| 0 | main table | 00 | 00 | 01 | 10 | 000 | 101 | 010 | 001 | 0 | 01.... | 0 |
| 0 | main table, preceeding=xx1 | 00 | 11 | 01 | 10 | 000 | 101 | 010 | 001 | 0 | 01.... | 0 |
| 0 | main table, preceeding=xx0 | 00 | 11 | 01 | 11 | 001 | 000 | 000 | 000 | 0 | 01.... | 0 |
| 1 | substitution | 00 | 11 | 01 | 11 | 001 | 000 | 000 | 000 | 0 | 01.... | 1 |

FIG.6

DEVICE AND METHOD FOR EMBEDDING A SECONDARY SIGNAL IN A PRIMARY DATA BIT STREAM ON AN OPTICAL DISC

The invention relates to a device and a corresponding method for embedding a secondary signal of a secondary channel in the primary data bit stream of a primary channel, wherein said primary data bit stream comprises a number of recording frames each starting with a frame sync followed by a number of DC-control blocks each including a number of primary data bits and a DC-control bit and wherein said primary data bit stream with embedded secondary signal shall be modulation encoded, in particular by a 17PP modulation encoder, using a first or a second modulation table, wherein the second modulation table is used only for modulation encoding of predetermined combinations of the last bits of a recording frame, and wherein the first bit of a frame sync indicates which modulation table has been used for modulation encoding of the last bits of the previous recording frame.

The invention relates further to a device and a corresponding method for encoding a primary signal of a primary channel and a secondary signal of a secondary channel into a channel bit stream.

Still further the invention relates to a device and a corresponding method for extracting a secondary signal of a secondary channel from a modulation bit stream representing a primary data bit stream of a primary channel with embedded secondary signal.

Finally, the present invention relates to a record carrier for storing a modulation bit stream representing a primary data bit stream of a primary channel into which a secondary signal of a secondary channel has been embedded and to a corresponding signal carrying such a modulation bit stream.

For copy protection and digital rights management it is often necessary to store a key (typically 256 or 512 bit) on a record carrier. In WO 02/15185 (PHNL000451) it is described how to encode and decode a secondary signal in a RLL code sequence. The secondary signal is stored in the absolute polarity at a predetermined position; this polarity is set using the degree of freedom in the DC-control means (for CD: merging bits; for DVD: primary/secondary syncs, main/substitution table, state flip; for BD: DC-control bits). To encode a secondary signal in the polarity of the channel bit stream, two parameters are important: the location where the polarity is controlled, and the location where the polarity is detected.

In the Blu-ray disc (BD) format, the polarity can be controlled with one or more DC-control bits in a recording frame. The location where the polarity is detected is more difficult to choose. The choice of a DC-control bit value affects the polarity of the channel bits further in the modulation bit stream, which may lead to completely different modulation bit streams. In general, the two choices of the DC-control bit do not lead to two candidate sections of the channel bit stream that are just the polarity-reversed version of each other. Further, not at all positions an inversion of the DC-control bit leads to an opposite polarity of the modulation bit stream. These two aspects are related to the particular structure of the 17PP modulation code, which is designed as a synchronous variable-length code, and to the way how DC-control can be realized with this code.

Details of the BD standard are disclosed in different US patents. In particular, U.S. Pat. No. 5,477,222 discloses a device for encoding/decoding n-bit source words into corresponding m-bit channel words and details of the PP channel code as used in BD. U.S. Pat. No. 6,225,921 discloses the use of different sync words in such a PP channel code. U.S. Pat. No. 6,496,541 and U.S. Pat. No. 6,677,866 disclose further details of the PP channel code, for instance DSV control means. Details of the BD channel code, in particular the 17PP modulation code, relevant for understanding and implementing the present invention can also be found in these documents which are herein incorporated by reference as regards such details.

It is an object of the present invention to provide a solution for the above problems, i.e. to find an optimum location for control of the polarity for embedding a secondary signal of a secondary channel in the primary data bit stream of a primary channel and an optimum solution for detection of the polarity during extraction of the secondary signal from the modulation bit stream.

This object is achieved by a device for embedding a secondary signal of a secondary channel in the primary data bit stream of a primary channel as claimed in claim 1 comprising:
 a check unit for checking if a setting of the last DC-control bit of a first recording frame to two different bit values results in an identical polarity of the frame sync of a second recording frame directly following said first recording frame,
 a setting unit for setting,
a) in a first case, where said check results in different polarities, the last DC-control bit of the first recording frame to a bit value controlled by the bit value of a secondary bit of said secondary signal to be embedded resulting in a polarity of the frame sync of the second recording frame representing the bit value of said secondary bit, or
b) in a second case, where said check results in identical polarities, the second last DC-control bit of the first recording frame or the first bit of the frame sync of the second recording frame to a bit value controlled by the bit value of said secondary bit.

The invention is based on the idea that the location of the polarity detection is chosen in the frame sync (also called sync pattern) of a recording frame. The sync body of the frame sync generally contains long runlengths, preferably 9T runlengths as for the BD format, where two consecutive 9T runlengths are present, which can be robustly detected. The polarity control is done—in a first case—with the last DC-control bit of the previous (first) recording frame. If this does not allow to uniquely determine the polarity of the frame sync of the subsequent (second) recording frame, i.e. if an inversion of the DC-control bit value does not lead to opposite polarity in the sync pattern, it is done—in a second case—by the second last DC-control bit of the previous (first) recording frame, or by the first bit of the frame sync of the subsequent (second) recording frame.

The first bit of the frame sync of a recording frame is used in the modulation scheme, in particular the 17PP modulation scheme, to indicate which modulation table has been used for modulation encoding of the last few bits at the end of the previous recording frame, i.e. this bit indicates to the decoder which modulation table shall now be used for demodulation of these last few bits at the end of this recording frame. It is proposed in a preferred embodiment that the setting unit is adapted for setting, if the check in the check unit for the setting of the last DC-control bit results in identical polarities, the last DC-control bit of the first recording frame to a fixed predetermined bit value so that the second modulation table is not used.

In particular, in case of using a 17PP modulation scheme, where a terminating modulation table or a main modulation table are used for modulation encoding, the last DC-control bit of the first recording frame is set to bit value 1. This case is preferably used in both cases where either said second last DC-control bit of the first recording frame or said first bit of the frame sync of the second recording frame is set to a bit value controlled by the bit value of said secondary bit.

In this way the terminating modulation table can never be used by the 17PP modulator, and the last DC-control bit of the first recording frame can not influence the polarity of the frame sync of the second recording frame. This polarity is only influenced by the setting of the second last DC-control bit of the first recording frame or the first bit of the frame sync of the second recording frame.

Due to the forced use of the main modulation table in this case, the first bit of the frame sync of the second recording frame is set to bit value 0, but can also be—incorrectly according to the use of the two tables—set to bit value 1 to control the polarity of the frame sync. In this case the demodulator would be able to recognize the setting of the first bit of the frame sync as incorrect since it is not able to demodulate the last bits of the previous recording frame by use of the terminating modulation table. This is due to the fact that the terminating modulation table has only two table entries, and does not cover all possible sections of the channel bit stream. However, a decoder could be adapted in the sense that in case it does not find the channel bit sequence within the entries of the terminating modulation table, that it uses the channel bit sequence of the main modulation table instead. In this way the 17PP code table for decoding is never violated and the secondary channel is always guaranteed. In case of using the second last DC-control bit such adaptation of the 17PP decoder is not needed since no violations of the modulation rules will occur.

It should be noted that this measure is preferred when using the invention with the BD format since the BD format does not guarantee the parity-preserve property (which is an essential property of the 17PP code) to be maintained across the boundaries between two consecutive recording frames: use of the terminating modulation table in the 17PP code tables at the end of a recording frame leads to a violation of the parity-preserve property.

In another embodiment of the invention the setting unit is adapted for setting, if said check in the check unit for the setting of the last DC-control bit results in identical polarities, the last DC-control bit of the first recording frame and the first bit of the frame sync of the second recording frame to a sequence of bit values controlled by the bit value of said secondary bit. Thus, according to this embodiment the polarity of the frame sync is controlled by a suitable choice of the combination of these bits. It is then not mandatory to set the last DC-control bit to bit value 1, but the bit values of the last DC-control bit of the first recording frame and the first bit of the frame sync of the second recording frame are selected such, that they together set the polarity of the frame sync of the second recording frame reflecting the bit value of the secondary bit. Preferably, the combinations of bit values of these two bits are selected such that no violations of the coding rules appear or, alternatively, that, if a violation does appear for one or more combinations, such violations are correctable by a decoder and do not lead to incorrect primary data during decoding.

According to a further preferred embodiment of the invention the check unit comprises a test modulation encoder and a polarity check unit. By these means the recording frames are as a test for further evaluation separately modulated by use of different settings of the last DC-control bit and it is checked if they result in different or identical polarities of the next frame sync.

Preferably the DC-control bit of a recording frame that is to be used for the setting of the secondary channel bit is located at the end of the recording frame. In this way the setting of the DC-control bit does not influence the polarity of the remaining portion of the modulated recording frame between the second last DC-control bit of a recording frame and the end of that recording frame. Preferably, the recording frame is divided into a number of DC-control blocks each comprising one DC-control bit at their end; the latter DC-control bit can influence the contribution of the channel bit stream of the next DC-block. At the end of a recording frame, there is a final DC-control bit which has been referred to above as the last DC-control bit of a recording frame.

The present invention also relates to a device for encoding a primary signal of a primary channel and a secondary signal of a secondary channel into a channel bit stream as claimed in claim 7, comprising:
- a transformer for transforming said primary signal into a primary data bit stream comprising a number of recording frames each starting with a frame sync followed by a number of DC-control blocks each including a number of primary data bits and a DC-control bit,
- a device for embedding said secondary signal of said secondary channel in said primary data bit stream as claimed in any one of claims 1 to 6, and
- a modulation encoder, in particular a 17PP modulation encoder (4), using a first or a second modulation table, wherein the second modulation table is used only for modulation encoding of predetermined combinations of the last bits of a recording frame, and wherein the first bit of a frame sync indicates which modulation table has been used for modulation encoding of the last bits of the previous recording frame.

In a preferred embodiment the modulation encoder is a 17PP modulation encoder which is adapted as defined in the BD standard for using a main modulation table and a terminating modulation table for modulation encoding as will be explained in more detail below. This embodiment is particularly applied with BD rewritable media, but can also be applied with other rewritable as well as with recordable or ROM media.

Further, the present invention also relates to a device for extracting a secondary signal of a secondary channel from a modulation bit stream representing a primary data bit stream of a primary channel with embedded secondary signal, wherein said primary data bit stream comprises a number of recording frames each starting with a frame sync followed by a number of DC-control blocks each including a number of primary data bits and a DC-control bit and wherein said primary data bit stream with embedded secondary signal has been modulation encoded, in particular by a 17PP modulation encoder, using a first or a second modulation table, wherein the second modulation table has been used only for modulation encoding of predetermined combinations of the last bits of a recording frame, and wherein the first bit of a frame sync indicates which modulation table has been used for modulation encoding of the last bits of the previous recording frame, said device comprising a polarity check unit for checking the polarity of the frame sync of a modulated second recording frame directly following a modulated first recording frame, said polarity representing a bit value of a secondary bit of said secondary signal.

Methods according to the present invention corresponding to the above described devices are defined in claims 11 to 13.

Still further, the present invention relates to a record carrier for storing a modulation bit stream as well as to a signal for carrying a modulation bit stream representing a primary data bit stream of a primary channel into which a secondary signal of a secondary channel has been embedded, wherein said modulation bit stream comprises a number of modulated recording frames each starting with a frame sync followed by a number of DC-control blocks each including a number of primary data bits and a DC-control bit, said primary data bit stream with embedded secondary signal has been modulation encoded by a modulation encoder, in particular by a 17PP modulation encoder, using a first or a second modulation table, wherein the second modulation table has been used only for modulation encoding of predetermined combinations of the last bits of a recording frame, and wherein the first bit of a frame sync indicates which modulation table has been used for modulation encoding of the last bits of the previous recording frame, and the second last DC-control bit of the first recording frame or the first bit of the frame sync of the second recording frame is set to a bit value controlled by the bit value of a secondary bit of said secondary signal embedded in said primary data bit stream resulting in a polarity of the frame sync of the second recording frame representing the bit value of said secondary bit, if a setting of the last DC-control bit of a first recording frame to two different bit values results in an identical polarity of the frame sync of said second recording frame directly following said first recording frame.

Preferably, in case the first bit of the frame sync of the second recording frame is set to a bit value controlled by the bit value of a secondary bit of said secondary signal embedded in said primary data bit stream, it may occur that the first bit of the frame sync of one or more modulated recording frames is set to a bit value equal to 1 which is not correct in view of the use of the main modulation table for the last modulation bits preceding said first bit, the use of which has been enforced by putting the last DC-control bit equal to 1, where the above measures clearly indicate the use of the present invention.

Finally, the present invention also relates to a computer program for implementing said methods according to the present invention on a computer.

Figures 2, 3:
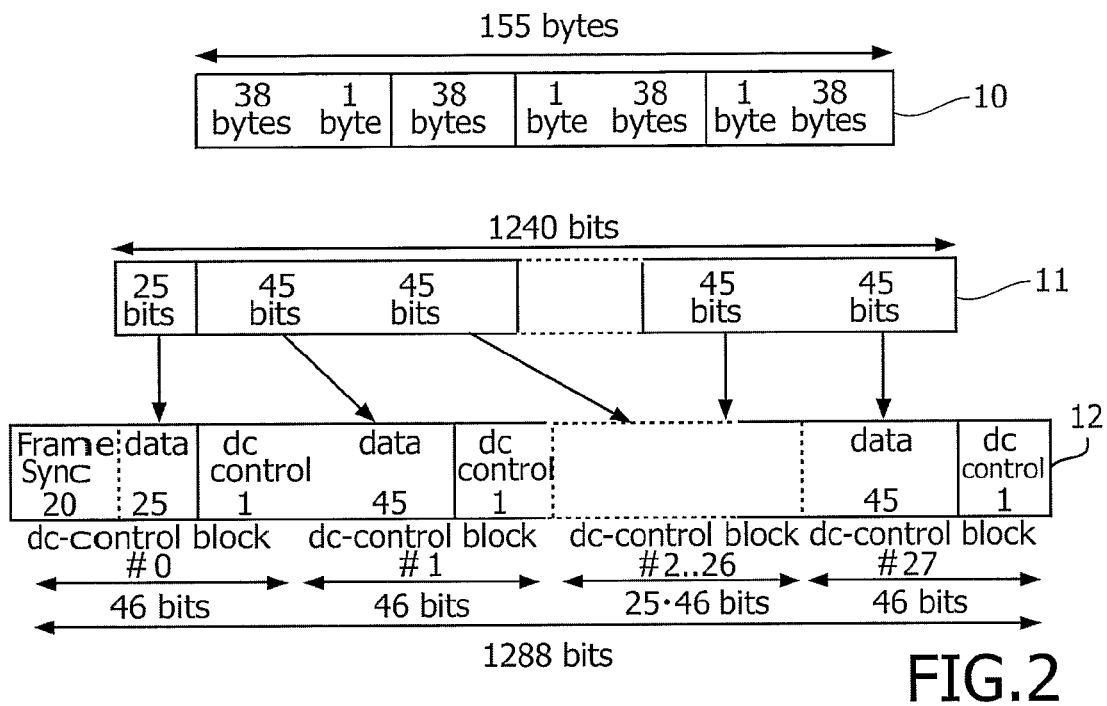
Figure 7:
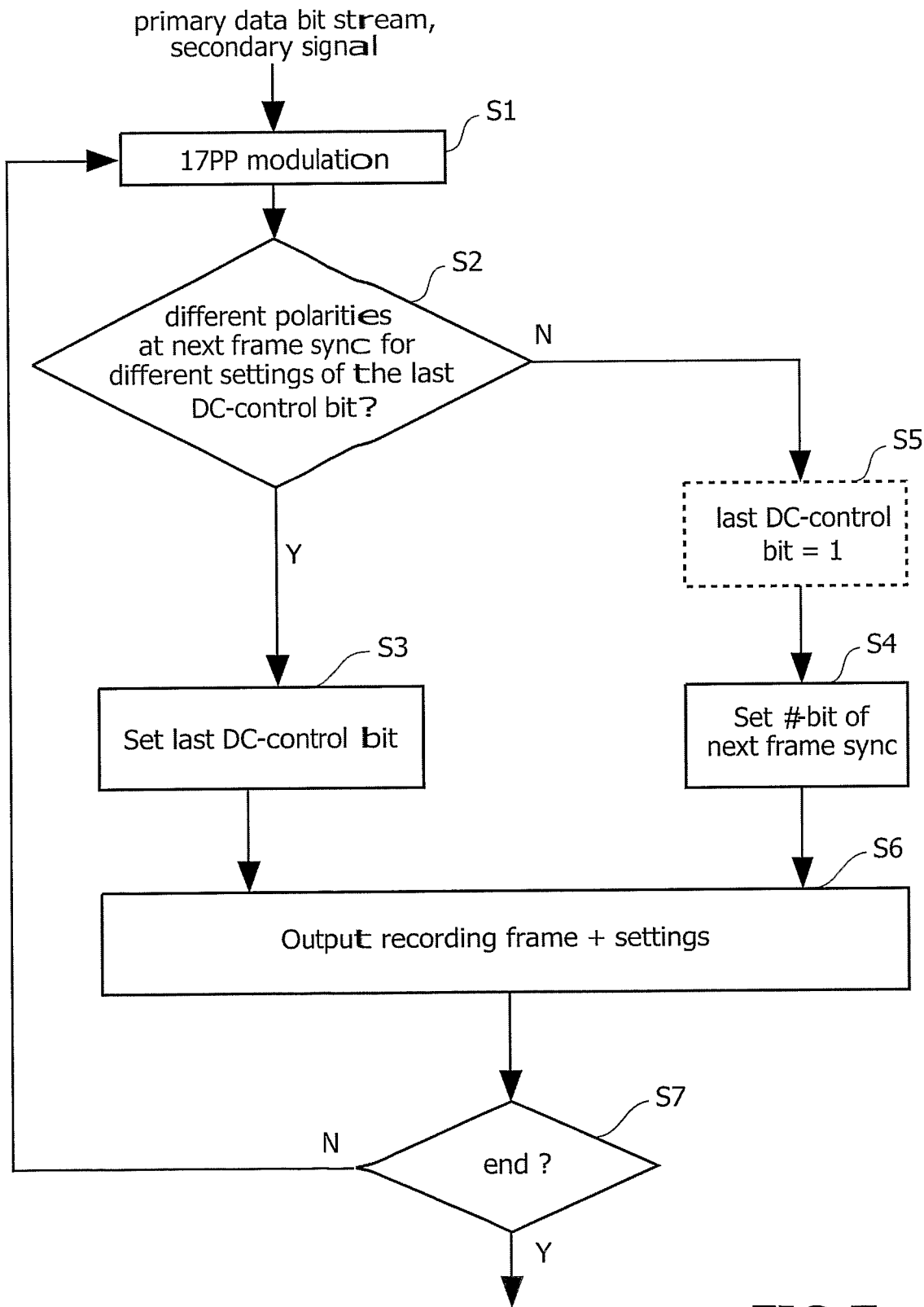
Figure 8:
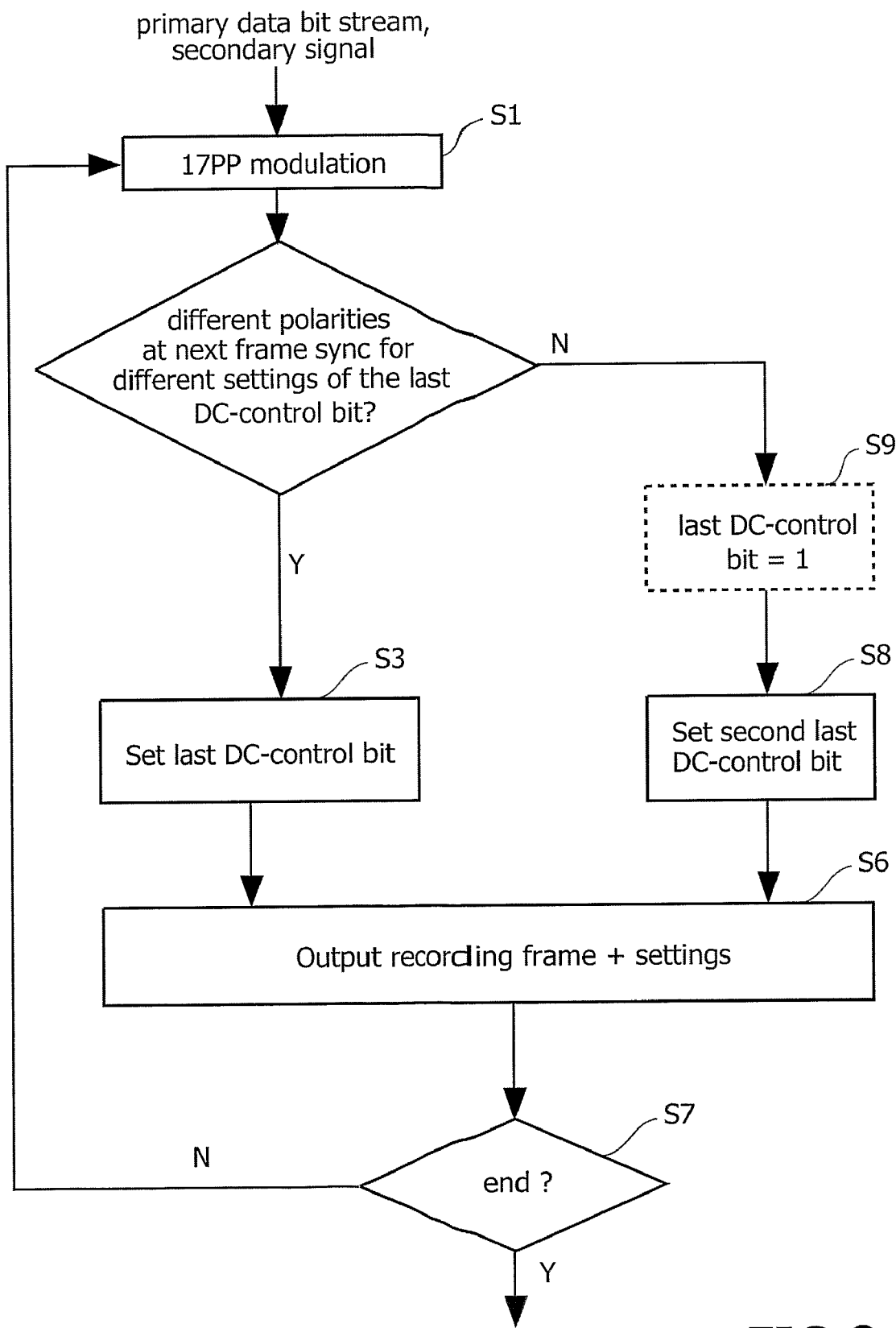
Figure 9:
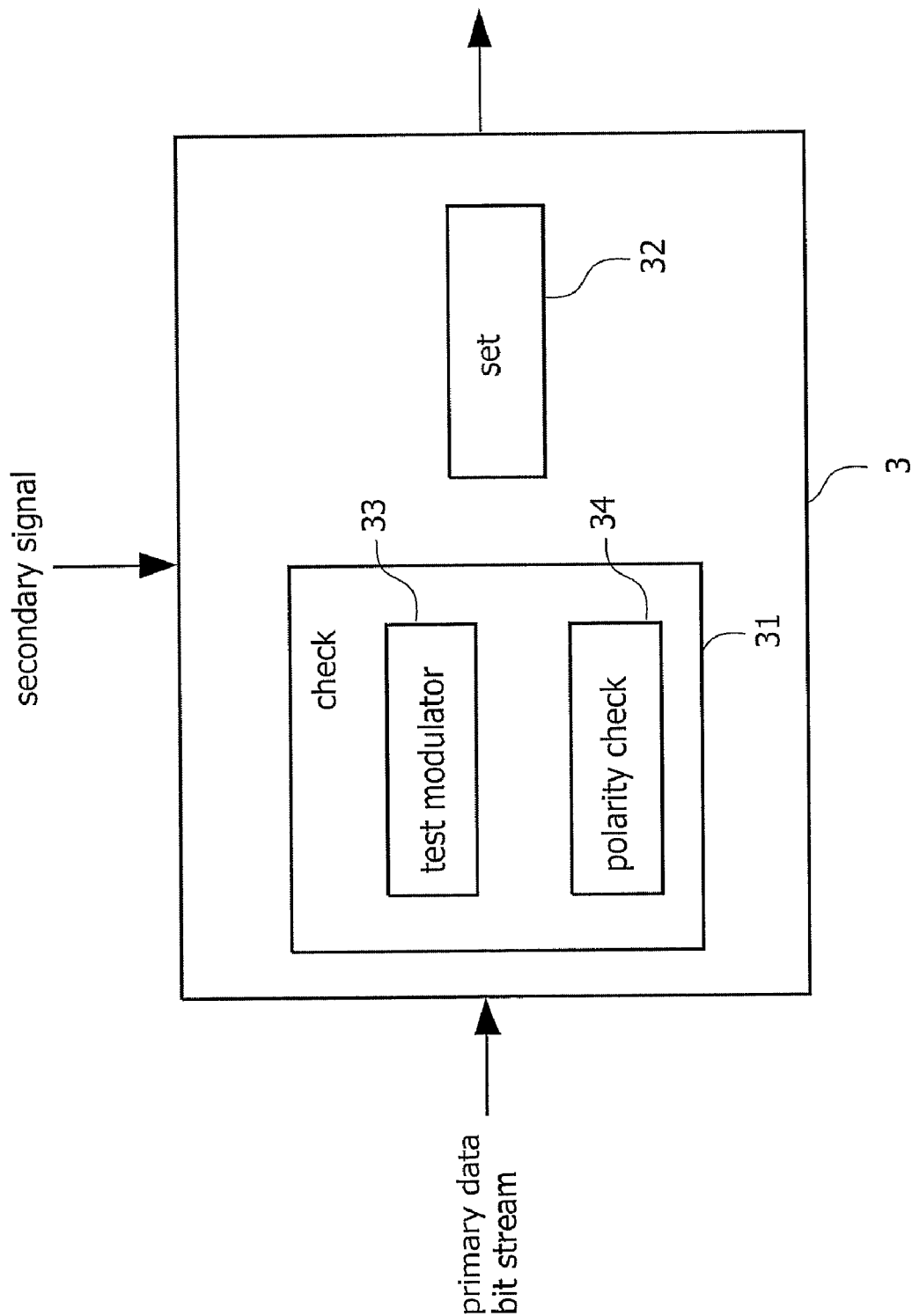
Figure 10:
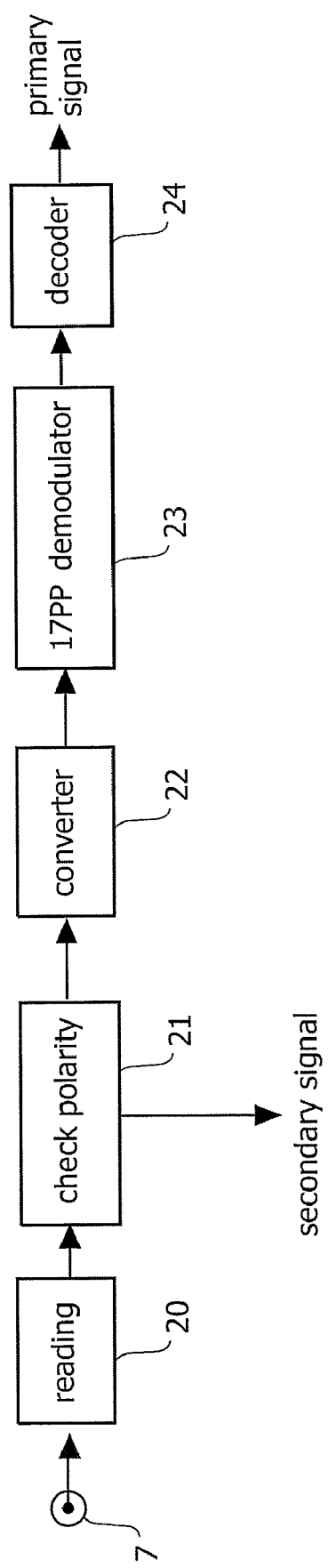

The invention will now be explained in more detail with reference to the drawings in which FIG. 1 shows a block diagram of a recording apparatus according to the present invention, FIG. 2 shows the relationship between rows of an ECC cluster, each row comprising 155 byte-symbols, and recording frames as defined in the BD standard, FIG. 3 shows the 17PP modulation code conversion tables, FIG. 4 shows the 30-bit frame sync codes, FIG. 5 shows two examples illustrating the problems of polarity control using different settings of a DC-control bit, FIG. 6 shows all possible data bit patterns before the frame sync with two opposite settings of the last DC-control bit, FIG. 7 shows a flow chart illustrating a first embodiment of the present invention, FIG. 8 shows a flow chart illustrating a second embodiment of the present invention, FIG. 9 shows an embodiment of an embedding unit according to the present invention and FIG. 10 shows a read-out device according to the present invention.

In the following, the present invention shall be explained with reference to a particular embodiment in which the BD rewritable format is applied for encoding a primary signal of a primary channel. Into the primary data bit stream of this primary signal a secondary signal of a secondary channel, for instance a key used for encryption or decryption, an identifier of the particular record carrier or some other copy protection data, shall be embedded which shall not be modifiable by the user, but need to be robustly detectable.

First, the general layout of a device according to the present invention for encoding a primary signal of a primary (main) channel and a secondary signal of a secondary (side) channel and the relevant parts of the BD rewritable format shall be briefly explained with reference to FIGS. 1 to 4.

As shown in FIG. 1 the primary signal is first ECC encoded by an ECC encoder 1 into so-called ECC clusters. One row 10 of this ECC cluster is shown on top of FIG. 2 and comprises 155 bytes. Each row 10 of the ECC cluster is transformed by a transformer 2 into a recording frame 12 as shown on the bottom of FIG. 2 by adding locations for the frame sync bits and for the DC-control bits. For this purpose the stream 11 of 1240 data bits formed by the 155 bytes of each row 10 of the ECC cluster is divided into 1 group of 25 data bits and 27 groups of 45 data bits, with the most significant bits of the bytes handled first. The first group of 25 data bits is extended with 20 "virtual" data bit positions for the insertion of the frame sync, which is a special sequence of 30 modulation/channel bits (there do not exist the equivalent user bits for these channel bit sequence of the sync-pattern). Next, each group of 45 data bits is completed with 1 additional bit position to form a DC-control block. The 496 rows 10 from an ECC cluster, transformed into recording frames 12, are called a physical cluster.

After embedding the secondary signal into the primary data bit stream by use of an embedding device 3 which will be explained in more detail below, all the bits of the recording frames except the frame sync are converted to modulation bits by a 17PP modulator 4 according to a 17PP modulation code. This is an RLL (1, 7) code, with runlengths $\geq 2T$ and $\leq 8T$, and some special properties. PP means: parity preserve/prohibit RMTR. Parity preserve means that if the number of "1"s in the data bit stream is even, then also the number of "1"s in the modulation bit stream is even, and that, if the number of "1"s in the data bit stream is odd, then also the number of "1"s in the modulation bit stream is odd. This property makes it easy to control the low frequency content of the recorded signal efficiency. Prohibit RMTR means that the number of consecutive minimum runlength (2T) is limited to 6. Because of the low signal levels on minimum runlength this may improve the read-out performance; the limitation of RMTR to 6 also limits the back-tracking depth in the trace-back procedure of the Viterbi-processor used for bit-detection.

The table in FIG. 3 defines the conversion rules from data bits to modulation bits. The data bits shall be processed from the left to the right (msb's first, see FIG. 2). The last two or four remaining bits at the end of the recording frame shall be encoded according to the table for terminating bits in case the value of these few last bits all equal 0. "1" in the tables represents a transition in the recorded signal (NRZ channel bit stream).

Thereafter the modulation bit stream is converted to an NRZI channel stream by a converter 5, and subsequently recorded on a record carrier 7, such as an optical disc, by a recorder 6, as shown in this embodiment, or transmitted as a signal via a transmission line, such as the internet, or via a communication path of a communications network.

Because a "1" in the modulation bit stream means a transition in the recorded signal, the polarity of this signal can be inverted if an odd number of "1"s is added to the modulation bit stream in a controlled way. Because of the parity preserve property of the 17PP modulation code, this is possible just by inserting additional bits into the data bit stream and setting these to "1" if an inversion is needed. In this way the accumulated DSV of the recorded signal shall be minimized after each DC-control block by setting the DC-control bit at the end of the previous DC-control block to "0" or "1" (see FIG. 1).

The physical clusters consist of 16 address units, where each address unit contains 31 recording frames (see FIG. 2). A modulated recording frame starts with a frame sync consisting of 30 channel bits. The main body of the frame sync is formed by a 24-bit pattern violating the 17PP modulation rules (2 times runlength 9T). The last 6 bits define a signature which identifies 7 different frame sync patterns. The 6-bit signatures for the frame sync IDs are selected such that their distance with relation to transition shifts is ≧2.

If the last data bits preceding the frame sync have been coded according to the terminating modulation table (see FIG. 3), then the first modulation bit of the frame sync, i.e. the #-bit, is set to "1", else the #-bit is set to "0" (see FIG. 4). The frame sync patterns are defined in terms of modulation bits. A "1" in the table represents a transition in the recorded signal. Before recording on the disc or transmitting the signal, the frame sync codes are converted to an NRZI channel bit stream by the converter 5.

Further details regarding the BD format can, for instance, be found in the BD rewritable format standard, but are not required for understanding and carrying out the present invention.

In the BD format the polarity can be controlled with the DC-control bits in a recording frame. The location where the polarity is detected is more difficult to choose. The choice of a DC-control bit value affects the polarity of the channel bits further in the modulation bit stream, which may lead to completely different modulation bit streams, but the following problems occur:

1) The DC-control bit occurs at pre-determined positions in a recording frame, but can be at different (odd-indexed) locations in the data bit patterns of the different table entries of the main modulation table (starting to count from "0" at the first bit of a recording frame), depending of the data bits preceding the DC-control bit (e.g. if DC control bit N has value '0' and all other data bits are '0', it can be in data bit patterns "0N 00 00 00", "00 0N 00 00", "00 00 0N 00", "00 00 00 0N", "0N 00 00", etc. These different locations can lead to totally different modulation bit streams.

2) An opposite value of the DC-control bit does not necessarily lead to opposite polarity of the subsequent channel bits at all locations after the DC-control bit. This property of opposite polarities is only guaranteed at the end (last channel bit) of a recording frame and at the end (last channel bit) of a modulation word (because of the parity-preserve property of the 17PP modulation code), but the length of the modulation word depends on the data pattern (since the 17PP modulation code is a variable-length code, that is, the code table comprises mappings from 2 user bits to 3 channel bits, but also mappings of the type 4-to-6, 6-to-9 and 8-to-12).

Because of these problems, the secondary channel (also called side channel) can only be guaranteed if the polarity is detected at the last channel bit of a recording frame. The polarity control can be done at any DC-control bit in the recording frame provided that other subsequent DC-control bits do not change as a result of the choice of the DC-control bit used for the polarity control; hence, a practical location is the last DC-control bit in a recording frame. It can also be any location where the polarity of that channel bit is uniquely related to the polarity of the last channel bit of a recording frame.

Both above mentioned problems are shown in FIG. 5: as an example an arbitrary data stream is shown. In example A the DC-control bit is the 2$^{nd}$ bit in the stream, in example B it is the 4$^{th}$ bit in the stream. For both examples, the data bit stream and the modulation bit stream for both possible values (0 or 1) of the DC-control bit are shown. In the line 'polarity difference' it is shown at which channel bit locations the modulation bit streams have the same (0) or opposite (1) value for DC-control bit value 0 or 1 (of course the side channel can only be embedded into the modulation bit stream if an opposite DC-control bit value leads to an opposite channel bit value in the modulation bit stream). From FIG. 5 it can be seen that not all channel bit locations have an opposite polarity value if an opposite DC-control value is chosen, and that the same DC-control value can give different modulation polarities depending on the location of the DC-control bit in the data bit pattern, which in turn depends on the values of the previous data bits.

The conclusion from the above is that the preferred location of polarity detection is the last channel bit of a recording frame. This, however, has the following disadvantage: the last channel bit can be the first bit of a 3T runlength, which is not preferable for a robust detection of the side channel since its signal amplitude may be low.

To overcome the problems described above, the location of the polarity detection is chosen in the sync pattern of a recording frame. The sync body contains, as shown in FIG. 4, 9T runlengths, which can be robustly detected since the two consecutive 9T runlengths yield maximum modulation of the signal amplitude. The polarity control is preferably done with the last DC-control bit of the previous recording frame. If the side channel is encoded like this, another problem occurs: in the case that the last DC-control bit of a sync frame is set to '0' and the last data-bits are modulated according to the terminating modulation table, the polarity of the sync pattern following that sync frame is not inverted if the DC-control bit is turned to '1'. The reason for this is that, if the terminating modulation table is used, the first bit of the sync pattern (the '#'-bit as is shown in FIG. 4 and indicated in the Blu-ray disc standard) is set to '1', while, if the DC-control bit is turned to '1' (meaning a transition), the terminating modulation table is never used, and the '#'-bit is set to '0'. This is shown in FIG. 6: all possible data bit patterns are shown just before the sync frame, each with two opposite cases, i.e. DC-control bit '0' or '1'.

One option to overcome this problem is to control the polarity of the sync pattern by inverting the #-bit (first bit of sync frame) under the following conditions that need to be satisfied jointly:

1) The terminating modulation table is not used, which would mean that for the standard 17PP encoder in BD, the #-bit has to be set to 0.

2) In all cases where inversion of the last DC-control bit value of a recording frame does not lead to opposite polarity in the sync pattern of the next recording frame (this is the case if DC-control bit value '0' leads to the use of the terminating modulation table as is obvious from the first and third example in FIG. 6, with the two circles indicating the "0" at the DC-control bit). It should be noted that the runlength constraints are met for all these cases that are considered here.

This will not lead to errors during decoding since there is no ambiguity as has been tested with a 17PP decoder, since the #-bit might have been put equal to 1 for cases where it is obvious that the main code table (and not the terminating modulation table) has been used by the encoder.

It is generally also possible to use the #-bit directly to encode a side channel, that is, the #-bit will invert from '0' to '1'. However, it is not a guaranteed channel since data patterns may exist where the #-bits of some or even all frame syncs are already '1' because the termination table has been used. If the #-bit is flipped from '1' (indicating the use of the terminating modulation table) to '0', errors in the main channel might occur during decoding as can be shown by the following example showing the last bits in a recording frame:

| data bits | 01 | 00 | |
|---|---|---|---|
| channel bits | 010 | 000 \| 1 | (#-bit set to '1') |
| channel bits | 010 | 000 \| 0 | (#-bit flipped to '0' for secondary channel) |
| as-detected user bits | 00 | 10 | (errors in main or primary channel) |

In case the #-bit is set to 1 where it does not indicate the use of the terminating modulation table, although the main modulation table and not the terminating modulation table is used, existing decoders that decode according to the code tables as present in the BD standard might have conflicts, depending on their decoding strategy. Some decoders might even consider the intentionally introduced inconsistency as a channel error and pass this as erasure information for the last ECC-symbol of the current recording frame to the ECC decoder.

Another option of the current invention to overcome the above described problems appearing when using the last DC-control bit of a recording frame or the #-bit of the frame sync of a recording frame is to use the second last DC-control bit of a recording frame for polarity control. According to this option only in the cases where the terminating modulation table is used for modulation of the last data bits of the main channel, as is shown in FIG. 6, the DC-control bit 27 (starting to count from 0 for the first DC-control bit), i.e. the last DC-control bit of the recording frame is set to "1" by default. In this way the terminating modulation table can never be used. A consequence is that in the sync body following that recording frame the first bit, i.e. the #-bit, will be put to "zero". Thereafter the resulting user data stream is checked and the DC-control bit 26, i.e. the second last DC-control bit of the recording frame, is chosen in such a way that the frame sync, in particular one selected I9 runlength out of the two I9 runlengths in the sync body of the next recording frame, has the correct polarity, i.e. a polarity representing the bit value of the secondary bit to be encoded by use of this polarity. In this way there are never violations of the 17PP code tables for decoding and the secondary channel is fully guaranteed.

To illustrate the method of the present invention for embedding the secondary signal in the primary data bit stream two flow charts illustrating two embodiments are shown in FIGS. 7 and 8, and a block diagram of the embedding unit 3 is shown in FIG. 9. First, the primary data bit stream comprising a sequence of recording frames as has been explained above as well as the secondary signal, which can optionally be encoded before, is provided to a check unit 31. Therein by use of a test modulator 33 a recording frame is 17PP modulated in a first step S1 using the 17PP modulation code applied by the 17PP modulator 4. This test modulation is done twice for the same recording frame using different settings of the last DC-control bit which shall preferably be used for encoding one bit of the secondary signal which shall embedded in this recording frame.

Thereafter it is checked in step S2 by use of a polarity check unit 34 if the two different modulated recording frames lead to different polarities at the next frame sync, i.e. in the sync body of the frame sync of the subsequent recording frame. If this is the case the last DC-control bit of the present recording frame can be used for encoding one bit of the secondary signal which is thus set to the desired value in step S3 by use of the setting unit 32 so that the polarity of the next frame sync, in particular one selected I9 runlength out of the two I9 runlengths in the sync body of the next recording frame, represents the bit value of the encoded bit of the secondary signal.

If, however, the check in step S2 reveals that different settings for the last DC-control bit do not lead to different polarities in the next frame sync the last DC-control bit can not used for encoding the bit of the secondary signal. In this case there are two embodiments possible which are equivalent in guaranteeing the secondary channel based on the same idea of using a bit for polarity control that leads to different polarities in the next frame sync, without affecting the rest of the recording frame which might lead to different modulation bit streams. A first embodiment—shown in FIG. 7—uses the first bit (#-bit) of the next frame sync in conjunction with the last DC-control bit of the present recording frame, in the case when the terminating modulation table is not used. A second embodiment—shown in FIG. 8—uses the second last DC-control bit of the present recording frame. Generally, it is a matter of implementation which embodiment to use in a particular device or method in practice.

In the first embodiment the #-bit is directly set in step S4 by the setting unit 32 so that the polarity of this frame sync represents the bit value of the bit of the secondary signal to be embedded. Preferably, in step S5 before, the last DC-control bit of the present recording frame is set to bit value 1. This has the effect that the terminating modulation table is not used for 17PP modulation of the last bits of the primary data bit stream and the first bit (#-bit) of the next frame sync will automatically be set to bit value 0.

Now, in step S4, the setting of the #-bit can be made according to the desired bit value of the secondary bit. If this results in a bit value of 1 for the #-bit, this means that the decoder later used for demodulation decoding first assumes the terminating modulation table has been used. It will try to decode the last modulation bits (e.g. "010" for last DC-control bit=1, see FIG. 6 second row, fourth column) to data bits by the use of the terminating modulation table. However, the entry "010" does not occur in the terminating modulation table modulation bits. Since this entry does not occur in the table a smart decoder will not decode wrongly, but will try to decode using the main modulation table. Then decoding will again be correct despite the "error" or "inconsistency" in the #-bit which was needed for tuning the polarity.

In the second embodiment, shown in FIG. 8, the second last DC-control bit of the present recording frame is set by the setting unit 32 in step S8 so that it represents the bit value of the secondary bit. Again, preferably in step S9 before, the last DC-control bit of the present recording frame is set to bit value 1 so that the first bit (#-bit) of the next frame sync will automatically be set to bit value 0. In this embodiment the last DC-control bit and the #-bit do not have any influence on the polarity of the next frame sync, but only the second last DC-control bit does control the aimed polarity in the frame sync. In addition, the second embodiment might not have the disadvantage of a slight incompatibility with current 17PP decoders as explained above for the first embodiment.

In step S6 the recording frame with the chosen setting of the last or second last DC-control bit and, if necessary dependent on which embodiment is chosen, the setting of the #-bit of the next frame sync is outputted. If there are further recording frames in the primary data bit stream which is checked in step S7 it is continued with step S1, otherwise it is continued with 17PP modulation of the primary data bit stream with embedded secondary information into a modulation bit stream.

Further to the embodiment shown in FIG. 7 where the #-bit is used for polarity control, there is still another possibility based on this embodiment. As can be seen in FIG. 6 the first row has DC-control bit 0, which results in a certain polarity. The second row of the table in FIG. 6 has DC-control bit 1, but also results in the same polarity. To make a different polarity in this case, it is possible to set the #-bit" to bit value 1 in this second row. This means that the first polarity is made by choosing the first row with the last DC control bit equal to 0 and the #-bit equal to 1, and the reversed polarity is set by only setting the #-bit in the second row of FIG. 6 to 1 although the last DC-control bit is equal to 1. This is thus different from the embodiment shown in FIG. 7 where the last DC-control bit is preferably set to 1 by default and the polarity is tuned by the #-bit only. So in fact the last DC control bit does not necessarily need to be set to bit value 1 if it is chosen to select the polarity with the #-bit.

This can also be explained in another way as follows. Looking at the first two rows in the table of FIG. 6, there are the following two cases shown:

| DC-control bit | #-bit | parity |
|---|---|---|
| 0 | 1 | 1 |
| 1 | 0 | 1. |

In one option of the embodiment shown in FIG. 7 the last DC-control bit is set to 1 and the polarity is tuned with the #-bit:

| DC-control bit | #-bit | parity | |
|---|---|---|---|
| 1 | 0 | 1 | or |
| 1 | 1 | 0. | |

In the modification of the embodiment shown in FIG. 7, it is also allowed to set the last DC-control bit to 0.

To make parity 0 it is chosen:

| DC-control bit | #-bit | parity |
|---|---|---|
| 1 | 1 | 0. |

To make parity 1 it can be chosen between two alternatives:

| DC-control bit | #-bit | parity | |
|---|---|---|---|
| 0 | 1 | 1 | or |
| 1 | 0 | 1. | |

So in case parity 1 shall be set, it is still possible to choose the value of the last DC-control bit according to this modification. Only if parity 0 shall be set, then a violation of the coding rule for #-bit occurs, which can, however, be corrected by a suitable decoder. The combination "0 0" for the last DC-control bit and the following #-bit is, however, not allowed since this combination would lead to incorrect decoding results as explained elsewhere.

FIG. 10 shows the general layout of a device for read-out of a modulation bit stream representing a primary data bit stream of a primary channel into which a secondary signal has been embedded as explained above. In the embodiment shown in FIG. 10 the modulation bit stream is recorded as NRZI channel bit stream on an optical record carrier 7 and is read out by a reading unit 20. The NRZI channel bit stream is then provided to a polarity check unit 21 which extracts the secondary information therefrom. The polarity of this frame sync of the recording frames are subsequently checked, the polarity of each frame sync representing one bit of said secondary signal. From the polarity check unit 21 the secondary signal is then outputted. The NRZI channel bit stream is thereafter converted to the modulation bit stream by a converter 22 whereafter the modulation bit stream is demodulated by a 17PP demodulator 23 according to the 17PP modulation code used for encoding. Further, the demodulated bit stream is also provided to a decoder 24 for decoding and outputting the primary signal.

Generally, it is also possible to put the polarity check unit 21 between the 17PP demodulator 23 and the decoder 24. However, after conversion and 17PP demodulation the polarity information might get lost depending on the implementation of the 17PP demodulator, at the output of which only user data bits remain in principle. So to be sure that the polarity check occurs properly it is preferred to put the polarity check unit 21 between the reading unit 20 and the converter 22.

The present invention provides a simple and effective way to embed a secondary signal into a primary data bit stream of a primary channel by which the secondary channel can be guaranteed and does not depend on properties of the data bit stream. Furthermore the secondary signal can be detected from the modulation bit stream with high detection reliability, since it is encoded in the polarity of a long runlength (I9 or 9T).

The invention is preferably applied in the BD format, but can be as well applied in other formats that use the same type of modulation code and DC-control.

The invention claimed is:

1. Device for embedding a secondary signal of a secondary channel in the primary data bit stream of a primary channel, wherein said primary data bit stream comprises a number of recording frames (12) each starting with a frame sync followed by a number of DC-control blocks each including a number of primary data bits and a DC-control bit and wherein said primary data bit stream with embedded secondary signal shall be modulation encoded, in particular by a 17PP modulation encoder (4), using a first or a second modulation table, wherein the second modulation table is used only for modulation encoding of predetermined combinations of the last bits of a recording frame, and wherein the first bit of a frame sync indicates which modulation table has been used for modulation encoding of the last bits of the previous recording frame, said device comprising:
a check unit (31) for checking if a setting of the last DC-control bit of a first recording frame to two different bit values results in an identical polarity of the frame sync of a second recording frame directly following said first recording frame,
a setting unit (32) for setting,
a) in a first case, where said check results in different polarities, the last DC-control bit of the first recording frame to a bit value controlled by the bit value of a secondary bit of said secondary signal to be embedded resulting in a polarity of the frame sync of the second recording frame representing the bit value of said secondary bit, or
b) in a second case, where said check results in identical polarities, the second last DC-control bit of the first recording frame or the first bit of the frame sync of the second recording frame to a bit value controlled by the bit value of said secondary bit.

2. Device as claimed in claim 1, wherein said selling unit (32) is adapted for setting, if said check in the check unit (31) for the selling of the last DC-control bit results in identical polarities, the last DC-control bit of the first recording frame to a fixed predetermined bit value.

3. Device as claimed in claim 2, wherein said primary data bit stream with embedded secondary signal shall be modulation encoded by a 17PP modulation encoder using a main modulation table for the complete recording frame or at least the major part of the recording frame or a terminating modulation table predetermined combinations of the last bits of a recording frame and wherein said setting unit (32) is adapted for setting, if said check in the check unit (31) for the setting of the last DC-control bit results in identical polarities, the last DC-control bit of the first recording frame to bit value 1 to prevent the use of the terminating modulation table for modulation encoding.

4. Device as claimed in claim 1, wherein said setting unit (32) is adapted for setting, if said check in the check unit (31) for the setting of the last DC-control bit results in identical polarities, the last DC-control bit of the first recording frame and the first bit of the frame sync of the second recording frame to a sequence of bit values controlled by the bit value of said secondary bit.

5. Device as claimed in claim 1, wherein said check unit (31) comprises:
a test modulation encoder (33) for modulation encoding of the last data bits of the first recording frame using the two different bit values of the last DC-control bit of the first recording frame, and
a polarity check unit (34) for checking the polarity of the frame sync of the second recording frame after said two test modulation encodings.

6. Device as claimed in claim 1, wherein the DC-control bit of a recording frame that is to be used for the setting of the secondary channel bit is located at the end of the recording frame.

7. Device for encoding a primary signal of a primary channel and a secondary signal of a secondary channel into a modulation bit stream, comprising:
a transformer (2) for transforming said primary signal into a primary data bit stream comprising a number of recording frames each starting with a frame sync followed by a number of DC-control blocks each including a number of primary data bits and a DC-control bit,
a device (3) for embedding said secondary signal of said secondary channel in said primary data bit stream as claimed in claim 1, and
a modulation encoder (4), in particular a 17PP modulation encoder (4), using a first or a second modulation table, wherein the second modulation table is used only for modulation encoding of predetermined combinations of the last bits of a recording frame, and wherein the first bit of a frame sync indicates which modulation table has been used for modulation encoding of the last bits of the previous recording frame.

8. Device for encoding as claimed in claim 7, wherein said modulation encoder (4) is a 17PP modulation encoder and is adapted for using a main modulation table and a terminating modulation table for modulation encoding, said terminating modulation table being used for modulation encoding of predetermined combinations of the last bits of a recording frame, in which case the first bit of the frame sync of the subsequent recording frame is set to bit value 1.

9. Device for extracting a secondary signal of a secondary channel from a modulation bit stream representing a primary data bit stream of a primary channel with embedded secondary signal, wherein said primary data bit stream comprises a number of recording frames (12) each starting with a frame sync followed by a number of DC-control blocks each including a number of primary data bits and a DC-control bit and wherein said primary data bit stream with embedded secondary signal has been modulation encoded, in particular by a 17PP modulation encoder (4), using a first or a second modulation table, wherein the second modulation table has been used only for modulation encoding of predetermined combinations of the last bits of a recording frame, and wherein the first bit of a frame sync indicates which modulation table has been used for modulation encoding of the last bits of the previous recording frame,
said device comprising a polarity check unit (21) for checking the polarity of the frame sync of a modulated second recording frame directly following a modulated first recording frame, said polarity representing a bit value of a secondary bit of said secondary signal.

10. Device as claimed in claim 9, wherein said polarity check unit (21) is adapted for checking the polarity at an I9 runlength in the sync body of the frame sync.

11. Method for embedding a secondary signal of a secondary channel in the primary data bit stream of a primary channel, wherein said primary data bit stream comprises a number of recording frames (12) each starting with a frame sync followed by a number of DC-control blocks each including a number of primary data bits and a DC-control bit and wherein said primary data bit stream with embedded secondary signal shall be modulation encoded, in particular by a 17PP modulation encoder (4), using a first or a second modulation table, wherein the second modulation table is used only for modulation encoding of predetermined combinations of the last bits of a recording frame, and wherein the first bit of a frame sync indicates which modulation table has been used for modulation encoding of the last bits of the previous recording frame, said method comprising the steps of:
checking if a setting of the last DC-control bit of a first recording frame to two different bit values results in an identical polarity of the frame sync of a second recording frame directly following said first recording frame,
setting,
a) in a first case, where said check results in different polarities, the last DC-control bit of the first recording frame to a bit value controlled by the bit value of a secondary bit of said secondary signal to be embedded resulting in a polarity of the frame sync of the second recording frame representing the bit value of said secondary bit, or
b) in a second case, where said check results in identical polarities, the second last DC-control bit of the first recording frame or the first bit of the frame sync of the second recording frame to a bit value controlled by the bit value of said secondary bit.

12. Method for encoding a primary signal of a primary channel and a secondary signal of a secondary channel into a modulation bit stream, comprising the steps of:
transforming said primary signal into a primary data bit stream comprising a number of recording frames (12) each starting with a frame sync followed by a number of DC-control blocks each including a number of primary data bits and a DC-control bit,
embedding said secondary signal of said secondary channel in said primary data bit stream by a method as claimed in claim 11, and
modulation encoding, in particular 17PP modulation encoding, using a first or a second modulation table, wherein the second modulation table is used only for modulation encoding of predetermined combinations of the last bits of a recording frame, and wherein the first bit of a frame sync indicates which modulation table has been used for modulation encoding of the last bits of the previous recording frame.

13. Method for extracting a secondary signal of a secondary channel from a modulation bit stream representing a primary data bit stream of a primary channel with embedded secondary signal, wherein said primary data bit stream comprises a number of recording frames (12) each starting with a frame sync followed by a number of DC-control blocks each including a number of primary data bits and a DC-control bit and wherein said primary data bit stream with embedded secondary signal has been modulation encoded, in particular by a 17PP modulation encoder (4), using a first or a second modulation table, wherein the second modulation table has been used only for modulation encoding of predetermined combinations of the last bits of a recording frame, and wherein the first bit of a frame sync indicates which modulation table has been used for modulation encoding of the last bits of the previous recording frame,
comprising a step of checking the polarity of the frame sync of a modulated second recording frame directly following a modulated first recording frame, said polarity representing a bit value of a secondary bit of said secondary signal.

14. Record carrier for storing a modulation bit stream representing a primary data bit stream of a primary channel into which a secondary signal of a secondary channel has been embedded, wherein
said modulation bit stream comprises a number of modulated recording frames (12) each starting with a frame sync followed by a number of DC-control blocks each including a number of primary data bits and a DC-control bit,
said primary data bit stream with embedded secondary signal has been modulation encoded by a modulation encoder, in particular by a 17PP modulation encoder (4), using a first or a second modulation table, wherein the second modulation table has been used only for modulation encoding of predetermined combinations of the last bits of a recording frame, and wherein the first bit of a frame sync indicates which modulation table has been used for modulation encoding of the last bits of the previous recording frame, and
the second last DC-control bit of the first recording frame or the first bit of the frame sync of the second recording frame is set to a bit value controlled by the bit value of a secondary bit of said secondary signal embedded in said primary data bit stream resulting in a polarity of the frame sync of the second recording frame representing the bit value of said secondary bit, if a setting of the last DC-control bit of a first recording frame to two different bit values results in an identical polarity of the frame sync of said second recording frame directly following said first recording frame.

15. Record carrier as claimed in claim 14, wherein the first bit of the frame sync of one or more modulated recording frames is set to a bit value which is not correct in view of the last modulation bits preceding said first bit.

16. Signal carrying a modulation bit stream representing a primary data bit stream of a primary channel into which a secondary signal of a secondary channel has been embedded, wherein
said modulation bit stream comprises a number of modulated recording frames (12) each starting with a frame sync followed by a number of DC-control blocks each including a number of primary data bits and a DC-control bit,
said primary data bit stream with embedded secondary signal has been modulation encoded by a modulation encoder, in particular by a 17PP modulation encoder (4), using a first or a second modulation table, wherein the second modulation table has been used only for modulation encoding of predetermined combinations of the last bits of a recording frame, and wherein the first bit of a frame sync indicates which modulation table has been used for modulation encoding of the last bits of the previous recording frame, and
the second last DC-control bit of the first recording frame or the first bit of the frame sync of the second recording frame is set to a bit value controlled by the bit value of a secondary bit of said secondary signal embedded in said primary data bit stream resulting in a polarity of the frame sync of the second recording frame representing the bit value of said secondary bit, if a setting of the last DC-control bit of a first recording frame to two different bit values results in an identical polarity of the frame sync of said second recording frame directly following said first recording frame.

17. Computer program comprising program code means for carrying out the steps of the methods as claimed in claim 11 on a computer when said computer program is executed on a computer.

\* \* \* \* \*